United States Patent [19]
Okayama et al.

[11] Patent Number: 5,410,487
[45] Date of Patent: Apr. 25, 1995

[54] DYNAMIC ERROR CORRECTING APPARATUS FOR INERTIAL NAVIGATION

[75] Inventors: Hiroshi Okayama; Masao Kobayashi; Satoshi Ito; Yoshio Hirose, all of Tokyo, Japan

[73] Assignee: Japan Aviation Electronics Industry Limited, Tokyo, Japan

[21] Appl. No.: 20,840

[22] Filed: Feb. 22, 1993

[30] Foreign Application Priority Data

Feb. 28, 1992 [JP] Japan ................................. 4-043763

[51] Int. Cl.$^6$ ............................................. C06F 15/50
[52] U.S. Cl. .................................... 364/453; 364/454; 73/178 R
[58] Field of Search ............... 364/443, 453, 454, 459, 364/571; 73/178 R

[56] References Cited

U.S. PATENT DOCUMENTS

| | | | |
|---|---|---|---|
| 4,675,820 | 6/1987 | Smith et al. | 364/453 |
| 4,914,598 | 4/1990 | Krogmann et al. | 364/434 |
| 5,001,647 | 3/1991 | Rapiejko et al. | 364/453 |
| 5,050,087 | 9/1991 | Walrath et al. | 364/434 |
| 5,301,114 | 4/1994 | Mitchell | 364/453 |

FOREIGN PATENT DOCUMENTS 8600158  1/1986  WIPO .

*Primary Examiner*—Kevin J. Teska
*Assistant Examiner*—Susan Wieland
*Attorney, Agent, or Firm*—Pollock, Vande Sande & Priddy

[57] ABSTRACT

A counting section includes: a first gyro pulse counter which counts gyro pulses from each of X-, Y-, Z- and S-axis gyroscopes during each counting period after being reset immediately before the start of the counting period and outputs the count value as a first gyro pulse count value at fixed time intervals; and a second gyro pulse counter which is reset at said fixed time intervals, counts the gyro pulses and outputs the count value as a second gyro pulse count value. A dynamic error calculating section includes: gyro multipliers/subtractors whereby, for each combination of two different main axes, a mutual product difference of the gyro pulse count values for the two axes is calculated as a main-axis system gyro pulse error and, for each combination of one of the X, Y and Z axes and the S axis, a mutual product difference of the gyro pulse count values for the S axis and each of the X, Y and Z axes is calculated as an auxiliary-axis system gyro error; and a gyro error integrating section whereby each of the X-axis, Y-axis and Z-axis system gyro errors and the auxiliary-axis system gyro error, provided at the fixed time intervals, are accumulated within each calculation period to obtain a gyro error integrated value. A strap-down calculating processor uses the gyro error integrated values from the gyro error integrating section to calculate the correctional quantity of a coning error for each system wherein one of the X, Y and Z axes is replaced with the S axis.

2 Claims, 7 Drawing Sheets

DYNAMIC ERROR CORRECTING APPARATUS FOR INERTIAL NAVIGATION

BACKGROUND OF THE INVENTION

The present invention relates generally to an inertial navigation system wherein sensors such as a gyroscope and an accelerometer are provided on each of axes extended in at least four directions defined from a certain point to form a redundancy inertial sensor system and information pulses from each sensor are used to compute the velocity, position and attitude angle of an inertial object. More particularly, the invention pertains to an apparatus for correcting dynamic errors in such an inertial navigation system.

In a conventional strap down inertial navigation system, for example, as shown in FIG. 3, sensors are each provided on one of three axes (X, Y and Z axes) intersecting perpendicularly to one another and a skew axis (an S axis) diagonal to them to form a redundancy inertia sensor system. In this instance, if the S axis is selected such that it is spaced the same angle ($\theta$s) apart from any of the X, Y and Z axes, then the angle $\theta$s will have a value which satisfies $$\cos \theta s = 1/\sqrt{3}.$$

Sensors such as a gyroscope and an accelerometer are provided for each of the four axes so that data can be obtained for each axis, but information on the inertial object, such as its velocity, position and attitude angle, can be obtained with data from respective sensors in three of the four axes; in general, such information is obtained from the sensors of the three perpendicularly intersecting axes (X, Y and Z). With such a four-axis structure, even if failures occur in the sensors in one of the three axes, for example, in the Z axis, data from the S-axis sensors are converted into data equivalent to those from the Z-axis sensors so that necessary information can still be obtained as data from the sensors in the perpendicularly intersecting axes, and hence computations for navigation can be continued. The prior art utilizes this navigation system.

In the case of constituting sensor systems by combinations of three axes out of the four axes, a total of four sensor systems (X, Y, Z), (X, Y, S), (Y, Z, S) and (X, Z, S) are obtainable, and the necessary inertial object information is normally derived from information which is available from the sensors of the (X, Y, Z) system. In the case of the (Y, Z, S)-axis sensor system, data from the Y-, Z- and S-axis sensors are used to calculate data equivalent to those from the X-axis sensor, and in the case of the (X, Z, S)-axis sensor system, data from the X-, Z- and S-axis sensors are used to calculate data equivalent to those from the Y-axis sensor.

Since the data available from each sensor system are processed on a discrete-time basis, a motion accompanied by rotation usually develops a dynamic error except in specific cases. This error is a coning error in regard to the gyro output and a sculling error in regard to the accelerometer output. Computations for correcting such dynamic errors in the above-mentioned four sensor systems are expressed as listed below in the case of using linear expansions. In this instance, the dynamic error correcting computation is performed every preset computation cycle on the basis of the number of pulses which are provided from each sensor system during the period. Incidentally, respective symbols are explained below and suffixes, x, y, z and s indicate the axes concerned, respectively.

$\delta\theta_{xn}$, $\delta\theta_{yn}$, $\delta\theta_{zn}$: Integrated value of the correctional quantity of a coning error in the current computation cycle regarding the direction of rotation in each axis;

$\delta\theta_{xn-1}$, $\delta\theta_{yn-1}$, $\delta\theta_{zn-1}$: Integrated value of the correctional quantity of a coning error in the previous computation cycle regarding the direction of rotation in each axis;

$\Delta\theta_{xn}=\omega_x$, $\Delta\theta_{yn}=\omega_y$, $\Delta\theta_{zn}=\omega_z$, $\Delta\theta_{sn}=\omega_s$: Number of gyro output pulses counted in the current computation cycle regarding the direction of rotation in each axis;

$\theta_{xn-1}=\phi_x$, $\theta_{yn-1}=\phi_y$, $\theta_{zn-1}=\phi_z$, $\theta_{sn-1}=\phi_s$: Accumulated number of gyro output pulses counted until the previous computation cycle regarding the direction of rotation in each axis;

$\delta V_{xn}$, $\delta V_{yn}$, $\delta V_{zn}$: Integrated value of the correctional quantity of a sculling error in the current computation cycle regarding the direction of rotation in each axis;

$\delta V_{xn-1}$, $\delta V_{yn-1}$, $\delta V_{zn-1}$: Integrated value of the correctional quantity of a sculling error in the previous computation cycle regarding the direction of rotation in each axis;

$\Delta V_{xn}=A_x$, $\Delta V_{yn}=A_y$, $\Delta V_{zn}=A_z$, $\Delta V_{sn}=A_s$: Number of accelerometer output pulses in the current computation cycle regarding the direction of rotation in each axis.

Incidentally, it is also possible to use $\theta_{xn}$, $\theta_{yn}$, $\theta_{zn}$ (the numbers of gyro output pulses counted in the current computation cycle regarding the direction of rotation in the respective axes) for $\theta_{xn-1}$, $\theta_{yn-1}$, $\theta_{zn-1}$. The symbols $\phi_x$, $\phi_y$, $\phi_s$, $\omega_x$, $\omega_y$, $\omega_z$, $A_x$, $A_y$, $A_z$ and $A_s$ in the above have been introduced to simplify expressions in the following description and in the drawings.

1. Correctional quantity of a coning error in the (X, Y, Z)-axis sensor system:

$$\begin{aligned}\delta\theta_{xn} &= \delta\theta_{xn-1} + \theta_{yn-1}\cdot\Delta\theta_{zn} - \Delta\theta_{zn-1}\cdot\Delta\theta_{yn} \\ &= \delta\theta_{xn-1} + \phi_y\omega_z - \phi_z\omega_y\end{aligned} \quad (1x)$$

$$\begin{aligned}\delta\theta_{yn} &= \delta\theta_{yn-1} + \theta_{zn-1}\cdot\Delta\theta_{xn} - \theta_{xn-1}\cdot\Delta\theta_{zn} \\ &= \delta\theta_{yn-1} + \phi_z\omega_x - \phi_x\omega_z\end{aligned} \quad (1y)$$

$$\begin{aligned}\delta\theta_{zn} &= \delta\theta_{zn-1} + \theta_{xn-1}\cdot\Delta\theta_{yn} - \theta_{yn-1}\cdot\Delta\theta_{xn} \\ &= \delta\theta_{zn-1} + \phi_x\omega_y - \phi_y\omega_x\end{aligned} \quad (1z)$$

Expressions (1x), (1y) and (1z) represent recurrence formulae of the accumulations of $\delta\theta_{xn}$, $\delta\theta_{yn}$ and $\delta\theta_{zn}$, respectively. Let it be assumed that when n=1, the first term $\delta\theta_{x0}$, $\delta\theta_{y0}$ and $\delta\theta_{z0}$ on the right sides of the above formulae are each zero. $\phi_x$, $\phi_y$, $\phi_z$, $\omega_x$, $\omega_y$ and $\omega_z$ are updated every 0.1 msec, for example, and by repeatedly performing the recurrence formulae (1x), (1y) and (1z) for 20 msec, that is, by accumulating $\delta\theta_{xn}$, $\delta\theta_{yn}$ and $\delta_{zn}$ from n=1 to 200, the correctional quantities which are given by the following expressions are obtained.

$$\Sigma\delta\theta_{xn}=\Sigma\{\phi_y\omega_z-\phi_z\omega_y\}=\Sigma\Delta C_A=C_A \quad (1a)$$

$$\Sigma\delta\theta_{yn}=\Sigma\{\phi_z\omega_x-\phi_x\omega_z\}=\Sigma\Delta C_B=C_B \quad (1b)$$

$$\Sigma\delta\theta_{zn} = \Sigma\{\phi_x\omega_y - \phi_y\omega_x\} = \Sigma\Delta C_C = C_C \qquad (1c)$$

2. Correctional quantity of a sculling error in the (X, Y, Z)-axis sensor system:

$$\delta V_{xn} = \delta V_{xn-1} + \theta_{yn-1} \cdot \Delta V_{zn} - \theta_{zn-1} \cdot \Delta V_{yn} \qquad (2x)$$
$$= \delta V_{xn-1} + \phi_y A_z - \phi_z A_y$$

$$\delta V_{yn} = \delta V_{yn-1} + \theta_{zn-1} \cdot \Delta V_{xn} - \theta_{xn-1} \cdot \Delta V_{zn} \qquad (2y)$$
$$= \delta V_{yn-1} + \phi_z A_x - \phi_x A_z$$

$$\delta V_{zn} = \delta V_{zn-1} + \theta_{xn-1} \cdot \Delta V_{yn} - \theta_{yn-1} \cdot \Delta V_{xn} \qquad (2z)$$
$$= \delta V_{zn-1} + \phi_x A_y - \phi_y A_x$$

The correctional quantities which are calculated from the recurrence formulae (2x), (2y) and (2z) are given by the following expressions:

$$\Sigma\delta V_{xn} = \Sigma\{\phi_y A_z - \phi_z A_y\} = \Sigma\Delta S_A = S_A \qquad (2a)$$

$$\Sigma\delta V_{yn} = \Sigma\{\phi_z A_x - \phi_x A_z\} = \Sigma\Delta S_B = S_B \qquad (2b)$$

$$\Sigma\delta V_{zn} = \Sigma\{\phi_x A_y - \phi_y A_x\} = \Sigma\Delta S_C = S_C \qquad (2c)$$

Incidentally, the recurrence formulae (1x), (1y) and (1z) will hereinafter be generically called a formula (1) and the recurrence formulae (2x), (2y) and (2z) will be generically called a formula (2). Formulae in the following description will also be called similarly.

3. Correctional quantity of a coning error in the (X, Y, S)-axis sensor system:

$$\delta\theta_{xn} = \delta\theta_{xn-1} + \theta_{xn-1} \cdot \Delta\theta_{yn} - \theta_{yn-1} \cdot \Delta\theta_{xn} - \qquad (3x)$$
$$\sqrt{3}\,(\theta_{sn-1} \cdot \Delta\theta_{yn} - \theta_{yn-1} \cdot \Delta\theta_{sn})$$
$$= \delta\theta_{xn-1} + \phi_x\omega_y - \phi_y\omega_x - \sqrt{3}\,(\phi_s\omega_y - \phi_y\omega_s)$$

$$\delta\theta_{yn} = \delta\theta_{yn-1} + \theta_{xn-1} \cdot \Delta\theta_{yn} - \theta_{yn-1} \cdot \Delta\theta_{xn} + \qquad (3y)$$
$$\sqrt{3}\,(\theta_{sn-1} \cdot \Delta\theta_{xn} - \theta_{xn-1} \cdot \Delta\theta_{sn})$$
$$= \delta\theta_{yn-1} + \phi_x\omega_y - \phi_y\omega_x + \sqrt{3}\,(\phi_s\omega_x - \phi_x\omega_s)$$

$$\delta\theta_{zn} = \delta\theta_{zn-1} + \theta_{xn-1} \cdot \Delta\theta_{yn} - \theta_{yn-1} \cdot \Delta\theta_{xn} \qquad (3z)$$
$$= \delta\theta_{zn-1} + \phi_x\omega_y - \phi_y\omega_x$$

The correctional quantities which are calculated from the recurrence formulae (3x), (3y) and (3z) are given by the following expressions:

$$\Sigma\delta\theta_{xn} = \Sigma\{\Delta C_C - \sqrt{3}\,(\phi_s\omega_y - \phi_y\omega_s)\} \qquad (3a)$$

$$\Sigma\delta\theta_{yn} = \Sigma\{\Delta C_C + \sqrt{3}\,(\phi_s\omega_x - \phi_x\omega_s)\} \qquad (3b)$$

$$\Sigma\delta\theta_{zn} = \Sigma\Delta C_C = C_C \qquad (3c)$$

4. Correctional quantity of a sculling error in the (X, Y, S)-axis sensor system:

$$\delta V_{xn} = \delta V_{xn-1} + \theta_{xn-1} \cdot \Delta V_{yn} - \theta_{yn-1} \cdot \Delta V_{xn} - \qquad (4x)$$
$$\sqrt{3}\,(\theta_{sn-1} \cdot \Delta V_{yn} - \theta_{yn-1} \cdot \Delta V_{sn})$$
$$= \delta V_{xn-1} + \phi_x A_y - \phi_y A_x - \sqrt{3}\,(\phi_s A_y - \phi_y A_s)$$

$$\delta V_{yn} = \delta V_{yn-1} + \theta_{xn-1} \cdot \Delta V_{yn} - \theta_{yn-1} \cdot \Delta V_{xn} + \qquad (4y)$$
$$\sqrt{3}\,(\theta_{sn-1} \cdot \Delta V_{xn} - \theta_{xn-1} \cdot \Delta V_{sn})$$
$$= \delta V_{yn-1} + \phi_x A_y - \phi_y A_x + \sqrt{3}\,(\phi_s A_x - \phi_x A_s)$$

$$\delta V_{zn} = \delta V_{zn-1} + \theta_{xn-1} \cdot \Delta V_{yn} - \theta_{yn-1} \cdot \Delta V_{xn} \qquad (4z)$$
$$= \delta V_{zn-1} + \phi_x A_y - \phi_y A_x$$

The correctional quantities which are calculated from the recurrence formulae (4x), (4y) and (4z) are given by the following expressions:

$$\Sigma\delta V_{xn} = \Sigma\{\Delta S_C - \sqrt{3}\,(\phi_s A_y - \phi_y A_s)\} \qquad (4a)$$

$$\Sigma\delta V_{yn} = \Sigma\{\Delta S_C + \sqrt{3}\,(\phi_s A_x - \phi_x A_s)\} \qquad (4b)$$

$$\Sigma\delta V_{zn} = \Sigma\Delta S_C = S_C \qquad (4c)$$

5. Correctional quantity of a coning error in the (X, Z, S)-axis sensor system:

$$\delta\theta_{xn} = \delta\theta_{xn-1} + \theta_{zn-1} \cdot \Delta\theta_{xn} - \theta_{xn-1} \cdot \Delta\theta_{zn} + \qquad (5x)$$
$$\sqrt{3}\,(\theta_{sn-1} \cdot \Delta\theta_{zn} - \theta_{zn-1} \cdot \Delta\theta_{sn})$$
$$= \delta\theta_{xn-1} + \phi_z\omega_x - \phi_x\omega_z + \sqrt{3}\,(\phi_s\omega_z - \phi_z\omega_s)$$

$$\delta\theta_{yn} = \delta\theta_{yn-1} + \theta_{zn-1} \cdot \Delta\theta_{xn} - \theta_{xn-1} \cdot \Delta\theta_{zn} \qquad (5y)$$
$$= \delta\theta_{yn-1} + \phi_z\omega_x - \phi_x\omega_z$$

$$\delta\theta_{zn} = \delta\theta_{zn-1} + \theta_{zn-1} \cdot \Delta\theta_{xn} - \theta_{xn-1} \cdot \Delta\theta_{zn} - \qquad (5z)$$
$$\sqrt{3}\,(\theta_{sn-1} \cdot \Delta\theta_{xn} - \theta_{xn-1} \cdot \Delta\theta_{sn})$$
$$= \delta\theta_{zn-1} + \phi_z\omega_x - \phi_x\omega_z - \sqrt{3}\,(\phi_s\omega_x - \phi_x\omega_s)$$

The correctional quantities which are calculated from the recurrence formulae (5x), (5y) and (5z) are given by the following expressions:

$$\Sigma\delta\theta_{xn} = \Sigma\{\Delta C_B + \sqrt{3}\,(\phi_s\omega_z - \phi_z\omega_s)\} \qquad (5a)$$

$$\Sigma\delta\theta_{yn} = \Sigma\Delta C_B = C_B \qquad (5b)$$

$$\Sigma\delta\theta_{zn} = \Sigma\{\Delta C_B - \sqrt{3}\,(\phi_s\omega_x - \phi_x\omega_s)\} \qquad (5c)$$

6. Correctional quantity of a sculling error in the (X, Z, S)-axis sensor system:

$$\delta V_{xn} = \delta V_{xn-1} + \theta_{zn-1} \cdot \Delta V_{xn} - \theta_{xn-1} \cdot \Delta V_{zn} + \qquad (6x)$$
$$\sqrt{3}\,(\theta_{sn-1} \cdot \Delta V_{zn} - \theta_{zn-1} \cdot \Delta V_{sn})$$
$$= \delta V_{zn-1} + \phi_z A_x - \phi_x A_z + \sqrt{3}\,(\phi_s A_z - \phi_z A_s)$$

$$\delta V_{yn} = \delta V_{yn-1} + \theta_{zn-1} \cdot \Delta V_{xn} - \theta_{xn-1} \cdot \Delta V_{zn} \qquad (6y)$$
$$= \delta V_{yn-1} + \phi_z A_x - \phi_x A_z$$

-continued $$\delta V_{zn} = \delta V_{zn-1} + \theta_{zn-1} \cdot \Delta V_{xn} - \theta_{xn-1} \cdot \Delta V_{zn} - \sqrt{3} \, (\theta_{sn-1} \cdot \Delta V_{xn} - \theta_{xn-1} \cdot \Delta V_{sn}) \quad (6z)$$

$$= \delta V_{zn-1} + \phi_z A_x - \phi_x A_z - \sqrt{3} \, (\phi_s A_x - \phi_x A_s)$$

The correctional quantities which are calculated from the recurrence formulae (6x), (6y) and (6z) are given by the following expressions:

$$\Sigma \delta V_{xn} = \Sigma \{ \Delta S_B + \sqrt{3} \, (\phi_s A_z - \phi_z A_s) \} \quad (6a)$$

$$\Sigma \delta V_{yn} = \Sigma \Delta S_B = S_B \quad (6b)$$

$$\Sigma \delta V_{zn} = \Sigma \{ \Delta S_B - \sqrt{3} \, (\phi_s A_x - \phi_x A_s) \} \quad (6c)$$

7. Correctional quantity of a coning error in the (X, Z, S)-axis sensor system:

$$\delta \theta_{xn} = \delta \theta_{xn-1} + \theta_{yn-1} \cdot \Delta \theta_{zn} - \theta_{zn-1} \cdot \Delta \theta_{zn} \quad (7x)$$

$$= \delta \theta_{xn-1} + \phi_y \omega_z - \phi_z \omega_y$$

$$\delta \theta_{yn} = \delta \theta_{yn-1} + \theta_{yn-1} \cdot \Delta \theta_{zn} - \theta_{zn-1} \cdot \Delta \theta_{yn} - \sqrt{3} \, (\theta_{sn-1} \cdot \Delta \theta_{zn} - \theta_{zn-1} \cdot \Delta \theta_{sn}) \quad (7y)$$

$$= \delta \theta_{yn-1} + \phi_y \omega_z - \phi_z \omega_y - \sqrt{3} \, (\phi_s \omega_z - \phi_z \omega_s)$$

$$\delta \theta_{zn} = \delta \theta_{zn-1} + \theta_{yn-1} \cdot \Delta \theta_{zn} - \theta_{zn-1} \cdot \Delta \theta_{yn} + \sqrt{3} \, (\theta_{sn-1} \cdot \Delta \theta_{yn} - \theta_{yn-1} \cdot \Delta \theta_{sn}) \quad (7z)$$

$$= \delta \theta_{zn-1} + \phi_y \omega_z - \phi_z \omega_y + \sqrt{3} \, (\phi_s \omega_y - \phi_y \omega_s)$$

The correctional quantities which are calculated from the recurrence formulae (7x), (7y) and (7z) are given by the following expressions:

$$\Sigma \delta \theta_{xn} = \Sigma \Delta C_A = C_A \quad (7a)$$

$$\Sigma \delta \theta_{yn} = \Sigma \{ \Delta C_A - \sqrt{3} \, (\phi_s \omega_z - \phi_z \omega_s) \} \quad (7b)$$

$$\Sigma \delta \theta_{zn} = \Sigma \{ \Delta C_A + \sqrt{3} \, (\phi_s \omega_y - \phi_y \omega_s) \} \quad (7c)$$

8. Correctional quantity of a sculling error in the (X, Z, S)-axis sensor system:

$$\delta V_{xn} = \delta V_{xn-1} + \theta_{yn-1} \cdot \Delta V_{zn} - \theta_{zn-1} \cdot \Delta V_{yn} \quad (8x)$$

$$= \delta V_{xn-1} + \phi_y \cdot A_z - \phi_z \cdot A_y$$

$$\delta V_{yn} = \delta V_{yn-1} + \theta_{yn-1} \cdot \Delta V_{zn} - \theta_{zn-1} \cdot \Delta V_{yn} - \sqrt{3} \, (\theta_{sn-1} \cdot \Delta V_{zn} - \theta_{zn-1} \cdot \Delta V_{sn}) \quad (8y)$$

$$= \delta V_{yn-1} + \phi_y A_z - \phi_z A_y - \sqrt{3} \, (\phi_s A_z - \phi_z A_s)$$

$$\delta V_{zn} = \delta V_{zn-1} + \theta_{yn-1} \cdot \Delta V_{zn} - \theta_{zn-1} \cdot \Delta V_{yn} + \sqrt{3} \, (\theta_{sn-1} \cdot \Delta V_{yn} - \theta_{yn-1} \cdot \Delta V_{sn}) \quad (8z)$$

$$= \delta V_{zn-1} + \phi_y A_z - \phi_z A_y + \sqrt{3} \, (\phi_s A_y - \phi_y A_s)$$

The correctional quantities which are calculated from the recurrence formulae (8x), (8y) and (8z) are given by the following expressions:

$$\Sigma \delta V_{xn} = \Sigma \Delta S_A = S_A \quad (8a)$$

$$\Sigma \delta V_{yn} = \Sigma \{ \Delta S_A - \sqrt{3} \, (\phi_s A_z - \phi_z A_s) \} \quad (8b)$$

$$\Sigma \delta V_{zn} = \Sigma \{ \Delta S_A + \sqrt{3} \, (\phi_s A_y - \phi_y A_s) \} \quad (8c)$$

where the following physical formulae are used.

$$\theta_{xn} + \theta_{yn} + \theta_{zn} = \sqrt{3} \, \theta_{sn}$$

$$\theta_{xn-1} + \theta_{yn-1} + \theta_{zn-1} = \sqrt{3} \, \theta_{sn-1}$$

$$V_{xn} + V_{yn} + V_{zn} = \sqrt{3} \, V_{sn}$$

$$V_{xn-1} + V_{yn-1} + V_{zn-1} = \sqrt{3} \, V_{sn-1}$$

In the inertial navigation system, calculations for the velocity, position and attitude of the inertial object are usually updated with a period of about 20 msec (50 Hz) to 10 msec (100 Hz). In the inertial navigation system employing the gyro, since the frequency of dynamic noise by the gyro is hundreds of hertz, the dynamic error needs to be corrected with a period of 0.1 msec or so in the case of utilizing the above recurrence formulae.

The arrangement for correcting the dynamic error has such a construction as shown in FIGS. 4 and 5 for the formulae (1) and (2) corresponding to the (X, Y, Z)-axis sensor system (FIG. 4 showing one half of the arrangement and FIG. 5 the other half, FIGS. 4 and 5 being connected by reference character Ⓑ) and such a construction as shown in FIGS. 6 and 7 for the formulae (7) and (8) corresponding to the (Y, Z, S)-axis sensor system (FIG. 6 showing one half of the arrangement and FIG. 7 the other half, FIGS. 6 and 7 being connected by a reference character Ⓒ). Though not shown, the conventional apparatus further includes similar arrangements for performing the dynamic error calculations of the formulae (3) and (4) corresponding to the (X, Y, S)-axis sensor system and the formulae (5) and (6) corresponding to the (X, Z, S)-axis sensor system. Shown below each block is the counting period during which the number of pulses is counted in the block. In this case, the counting periods of the respective blocks start at the same time. A symbol $\Sigma$ means that the signal pulses are counted for the period indicated in each block.

Referring to FIGS. 4 and 5, reference numeral 12 denotes a counting section, which includes counters 1a to 1f, latches 2a to 2f, counters 6a to 6f and latches 7a to 7c. Reference numeral 13 indicates a dynamic error calculating section, which is made up of a calculating section 3 and an integrating part 9. Respective gyros (not shown) provide gyro pulses $\Delta\phi_x$, $\Delta\phi_y$ and $\Delta\phi_z$ each generated per unit quantity of rotation about their axes. These pulses are fed to positive or negative terminals according to the direction of rotation.

The counter 1a is reset upon each completion of counting of the sequentially input gyro pulses $\Delta\phi_x$ for the 20-msec counting period. During this period of time, the latch 2a latches the intermediate count value $\Delta\phi_x$ with a period of 0.1 msec and provides it to the calculating section 3. The latch 4a latches every counting period of 20 msec the final count value $\Phi_x$ in that period and provides it to a strap-down calculation processor 5, and at the same time, it resets the counting.

In the counter 1b the gyro pulses $\Delta\phi_x$ which are input thereinto are counted for a 0.1-msec counting period, and upon each completion of the counting period, the counting is reset. The latch 2a latches, every 0.1-msec period, the number of pulses, $\omega_x$, counted by the counter 1b to the point of time immediately before its resetting, and the latch 2a provides the count value to the calculating section 3. Similarly, the gyro pulses $\Delta\phi_y$ and $\Delta\phi_z$ are also counted by the corresponding counters 1c to 1f for the 0.1-msec period, and the count values are latched by the latches 2c to 2f, from which they are provided to the calculating section 3 and the latches 4b and 4c.

Accelerometers on the respective axes provide pulses $\Delta V_x$, $\Delta V_y$ and $\Delta V_z$ which are generated per unit magnitude of velocity variations in their axial direction. These acceleration pulses are applied to positive or negative terminals, depending upon whether the velocity is on increase or decrease.

A description will be given of the processing of the acceleration pulses $\Delta V_x$. The counter 6a counts the pulses $\Delta V_x$ for the 0.1-msec counting period and resets the counting upon each completion of the period. Let the number of pulses counted during one counting period be represented by $A_x$. The latch 7a of the next stage similarly fetches therein the pulse count value $A_x$ and provides the count value to the calculating section 3.

The counter 6b sequentially counts the acceleration pulses $\Delta V_x$ for the 20-msec computation period and is reset upon each completion of the period. Let the number of pulses counted during this period be represented by $V_x$. A latch 8a of an output section 4 fetches therein the pulse count value $V_x$ every 20-msec computation period (in synchronization with the counter 6b) and provides the numerical value to the strap-down calculation processor 5. The other acceleration pulses $\Delta V_y$ and $\Delta V_z$ are also similarly processed by the counters 6c to 6f and latches 7b, 7c, 8b and 8c.

In multiplier/subtractors 3a to 3c of the calculating section 3 the calculations shown in the second and third terms on the right side of the aforementioned formula (1) are performed to obtain calculated values $\Delta C_A$, $\Delta C_B$ and $\Delta C_C$ every 0.1 msec. In multiplier/subtractors 3g to 3i the calculations shown in the second and third terms on the right side of the formula (2) are performed to obtain calculated values $\Delta S_A$, $\Delta S_B$ and $\Delta S_C$ every 0.1 msec. In accumulators 9a to 9c and 9g to 9i of the integrating section 9 the calculated values obtained every 0.1 msec are accumulated in each 20-msec computation period to obtain integrated values $C_A$, $C_B$, $C_C$ and $S_A$, $S_B$, $S_C$ as shown in the expressions (1a), (1b), (1c) and (2a), (2b), (2c), respectively. In latches 10a to 10c and 10g to 10i these integrated values $C_A$, $C_B$, $C_C$ and $S_A$, $S_B$, $S_C$ are latched with a period of 20 msec, and they are provided to the strap-down calculating processor 5. Thus, the strap-down calculating processor 5 performs dynamic error correcting calculations given by the following expressions:

$\Phi_x + C_A$, $\Phi_y + C_B$, $\Phi_z + C_C$ $V_x + S_A$, $V_y + S_B$, $V_z + S_C$.

FIGS. 6 and 7 show an arrangement for dynamic error correcting processing shown by formulae (7) and (8) in the case of using the (Y, Z, S)-axis sensor system. The parts corresponding to those in FIGS. 4 and 5 are identified by the same reference numerals. The example shown in FIGS. 6 and 7 employs gyro pulses $\Delta\phi_y$, $\Delta\phi_z$, $\Delta\phi_s$ and acceleration pulses $\Delta V_y$, $\Delta V_z$, $\Delta V_s$. Since the processing in this example is the same as that described above in respect of FIGS. 4 and 5, no description will be given thereof. Incidentally, the fourth terms of the formulae (7y), (7z), (8y) and (8z) are multiplied by a factor of $\sqrt{3}$—this is effected in the strap-down calculating section 5. By this processing, the calculations of the above-mentioned formulae (7) and (8) are conducted. Also in the cases of the (X, Y, S)-axis and (X, Z, S)-axis sensor systems, processing corresponding to the formulae (3), (4) and (5), (6) are executed by arrangements (not shown) as in the above, and no description will be given of them.

In the event that the sensor on any one of the above-said axes has broken down or its performance has deteriorated, the calculations for navigation can be continued by use of sensors on the other three axes. However, the detection of such an abnormal sensor calls for the calculations involving all of the four sensor systems and dynamic error correcting calculations necessary therefor, that is, calculations of all of the formulae (1) to (8). Hence, large quantities of data to be processed for correction and high computation frequency are needed—this increases the load on the computer and enlarges the scale of the system.

SUMMARY OF THE INVENTION

It is therefore an object of the present invention to provide a dynamic error correcting apparatus for an inertial navigation system which is small-scale and permits reduction of the computational quantity involved.

The dynamic error correcting apparatus for an inertial navigation system according to the present invention includes: a counting section whereby information pulses available from inertia sensors provided on at least four axes, respectively, are counted for each predetermined computation period to obtain count values for the respective axes; a dynamic error calculating section whereby the count values of the information pulses, obtained by the counting section for the at least four axes, are calculated, in an arbitrary combination, with the predetermined computation period to obtain a plurality of combined dynamic error values; an output section which is supplied with the count values from the counting section and the dynamic error values from the dynamic error calculating section, latches them with the predetermined computation period and provides them to a strap-down calculating processor of the next stage; and a strap-down calculating processor which is supplied with the count values from the counting section and the dynamic error values from the dynamic error calculating section, fetched in the output section, and calculates inertial information of an inertial object on the basis of the said count values and dynamic error values, the strap-down calculating processor being used in common to the inertia sensors on the at least four axes.

The information pulses from the sensors on the four or more axes are combined into one system and they are counted in the counting section with a predetermined computation period. In the dynamic error calculating section the count value is used to calculate dynamic errors in common to the four or more axes, and in the strap-down calculating processor the multiplication by a factor of $\sqrt{3}$ and other calculations are performed in common to the four or more axes. Thus, the computational quantity that can be processed in common to all the axes is larger than in the prior art, and hence the load on the computer can be reduced accordingly.

DESCRIPTION OF THE PREFERRED EMBODIMENTS

Figure 1:
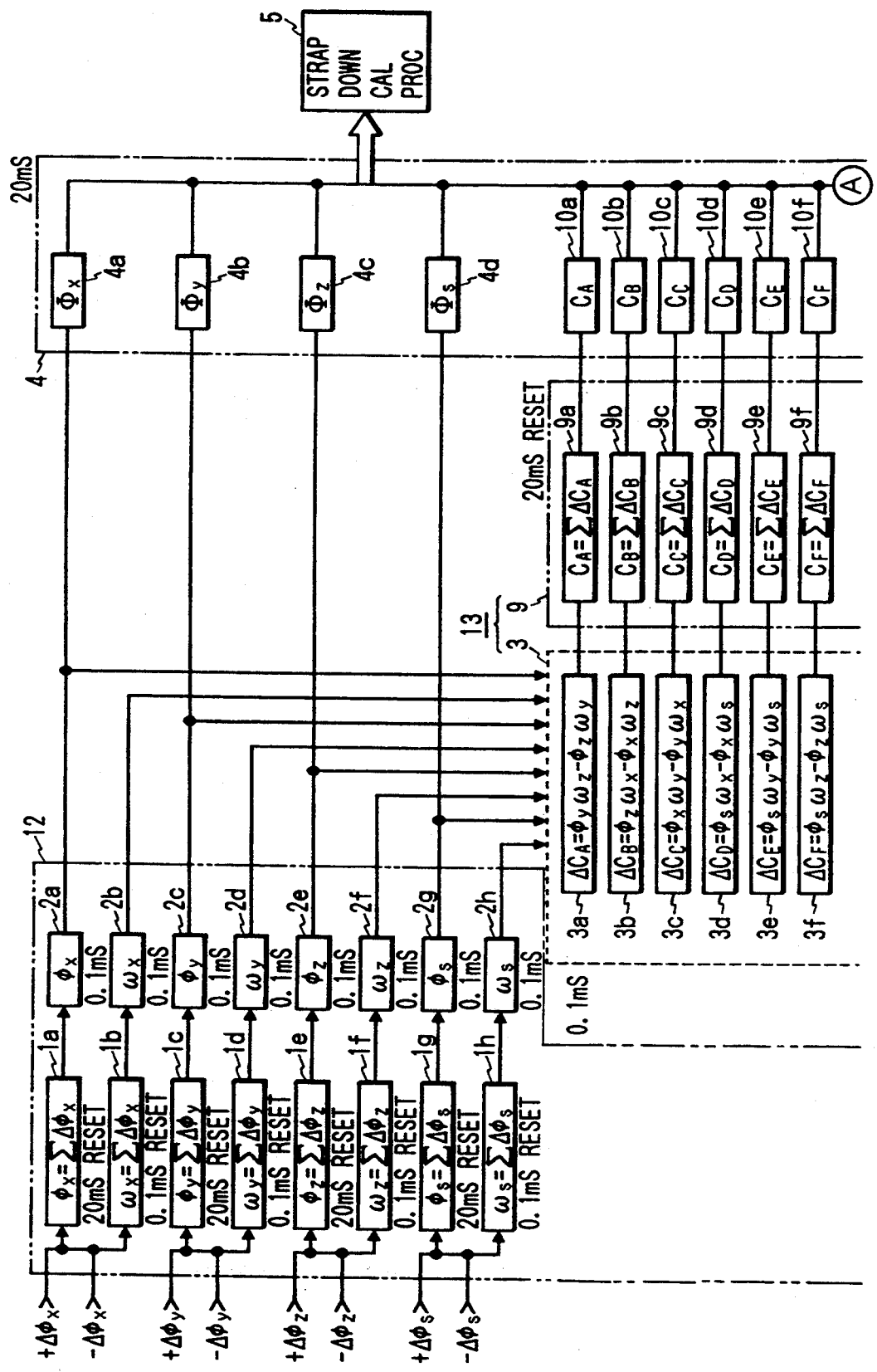
FIG. 1 is a block diagram of one half of the construction of a dynamic error correcting apparatus of the inertial navigation system according to the present invention.
Figure 2:
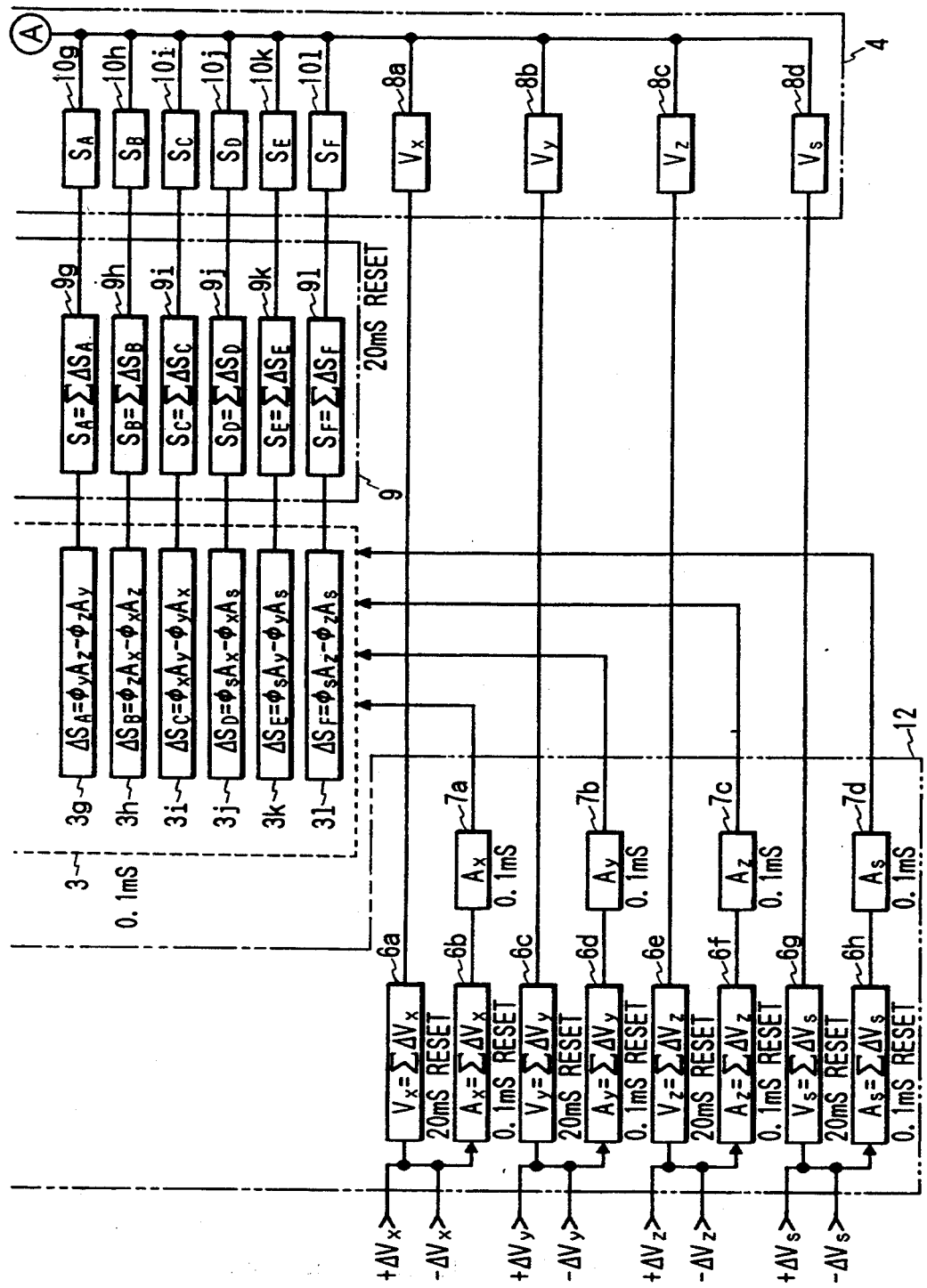
FIG. 2 is a block diagram of the other half of the construction of the dynamic error correcting apparatus.
Figure 3:
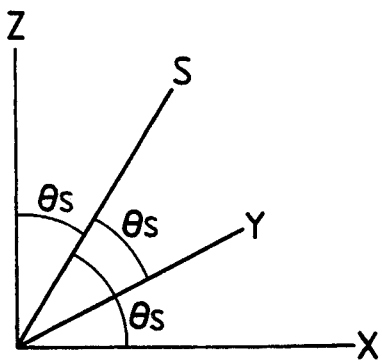
FIG. 3 is a diagram illustrating an example of the prior art redundancy inertia sensor system of the inertial navigation system.
Figure 4:
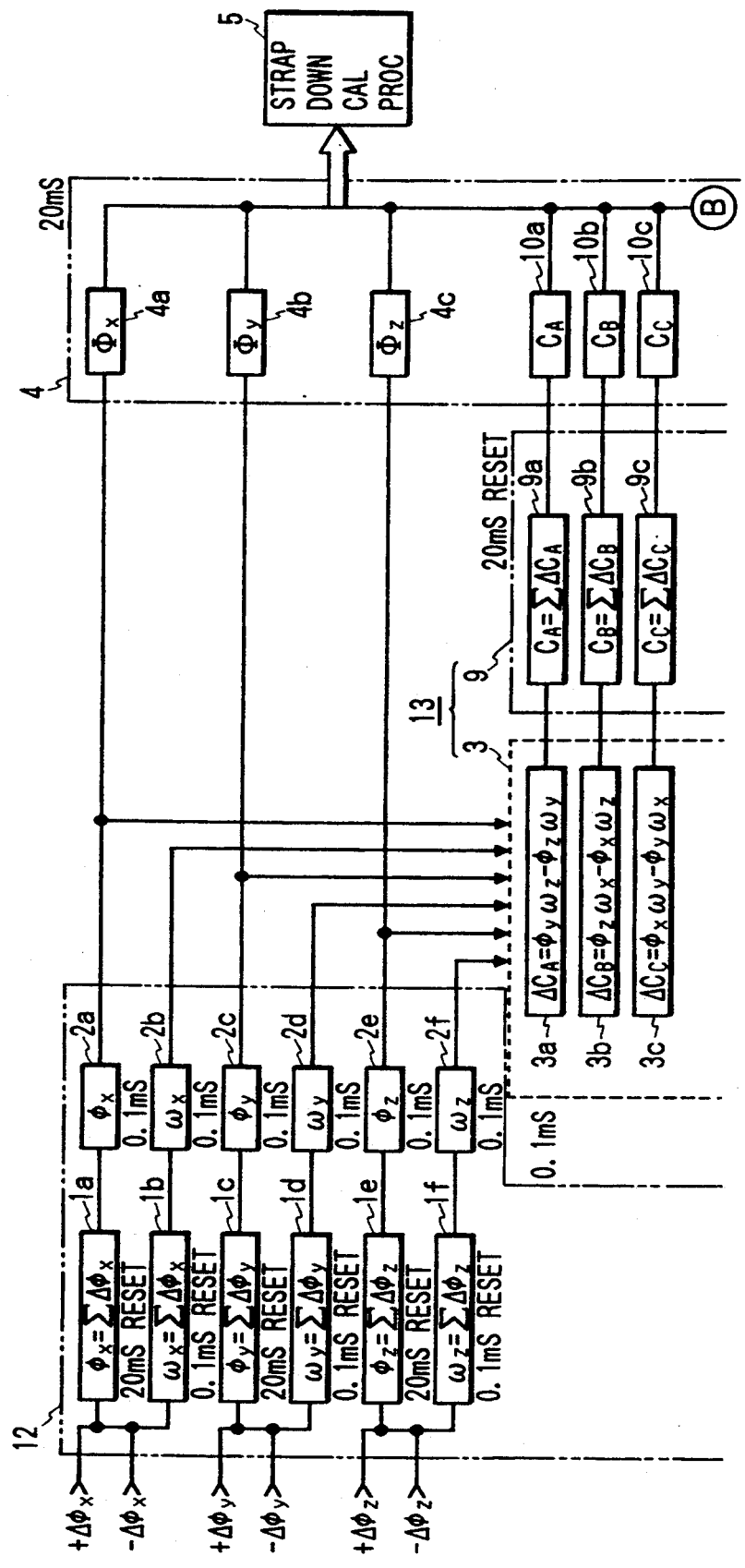
FIG. 4 shows one half of a block diagram which depicts part of a dynamic error correcting apparatus of a conventional inertial navigation system.
Figure 5:
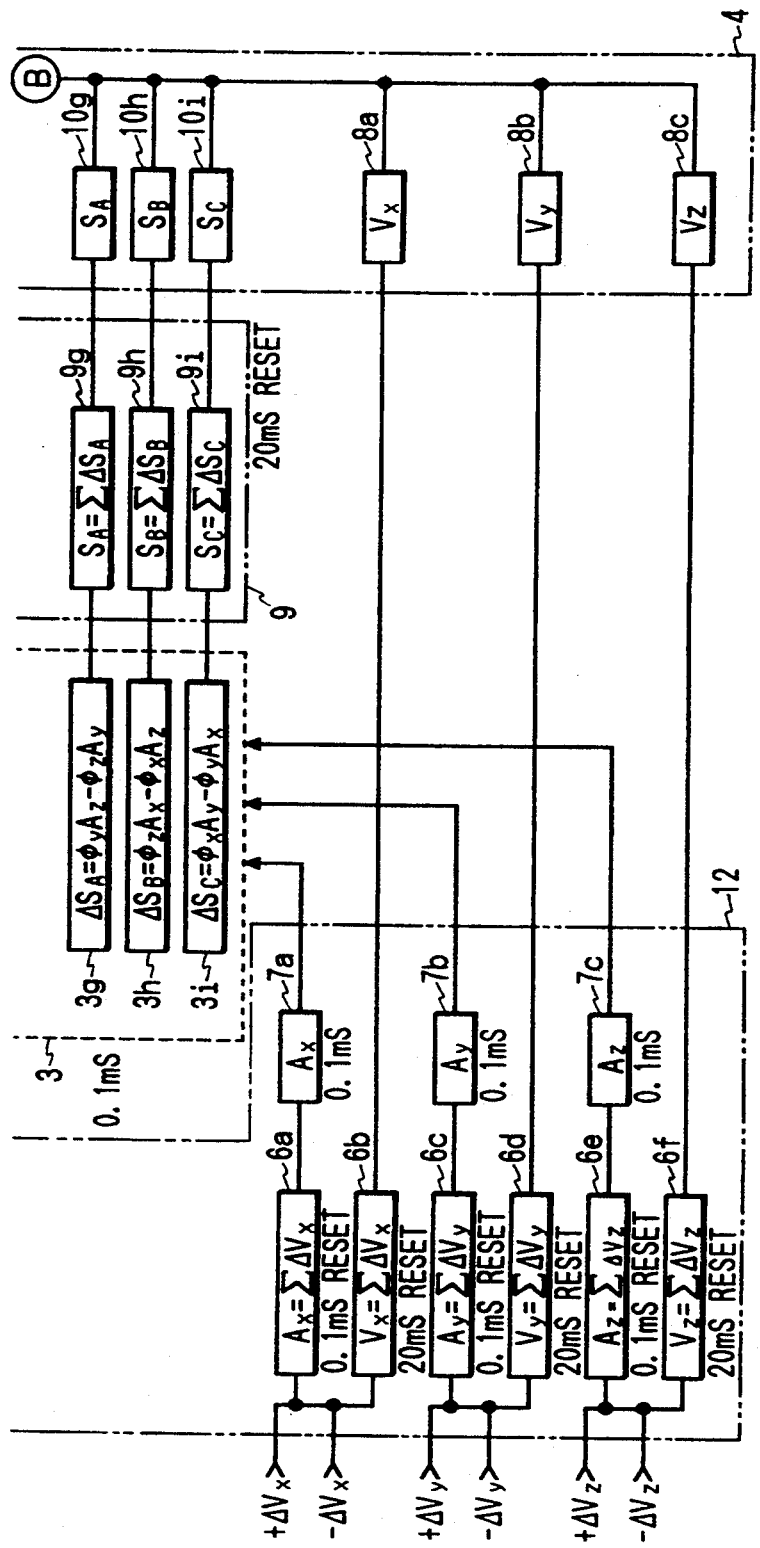
FIG. 5 is a diagram showing the other half of the apparatus depicted in FIG. 4.
Figure 6:
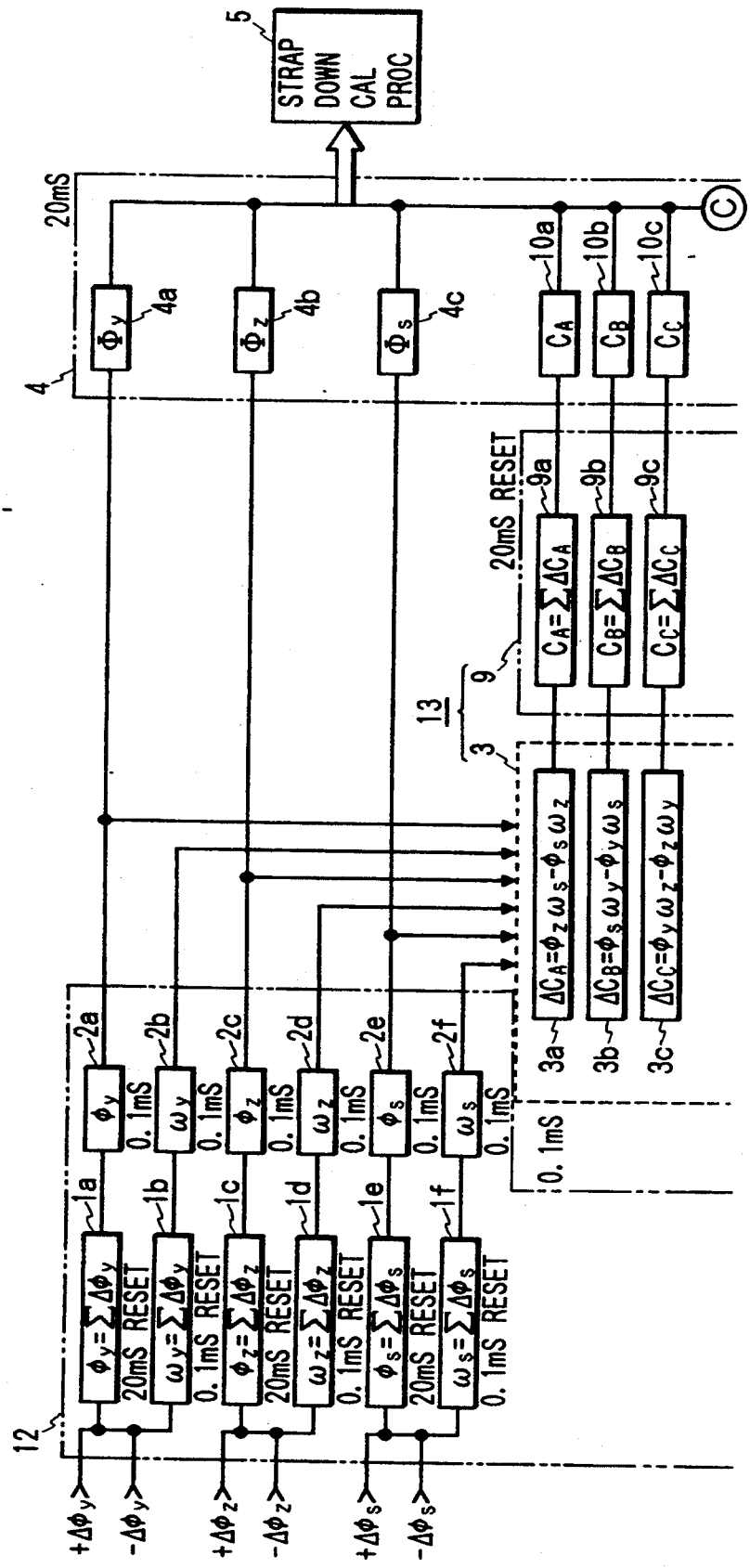
FIG. 6 is a block diagram showing one half of another part of the dynamic error correcting apparatus corresponding to FIG. 4.
Figure 7:
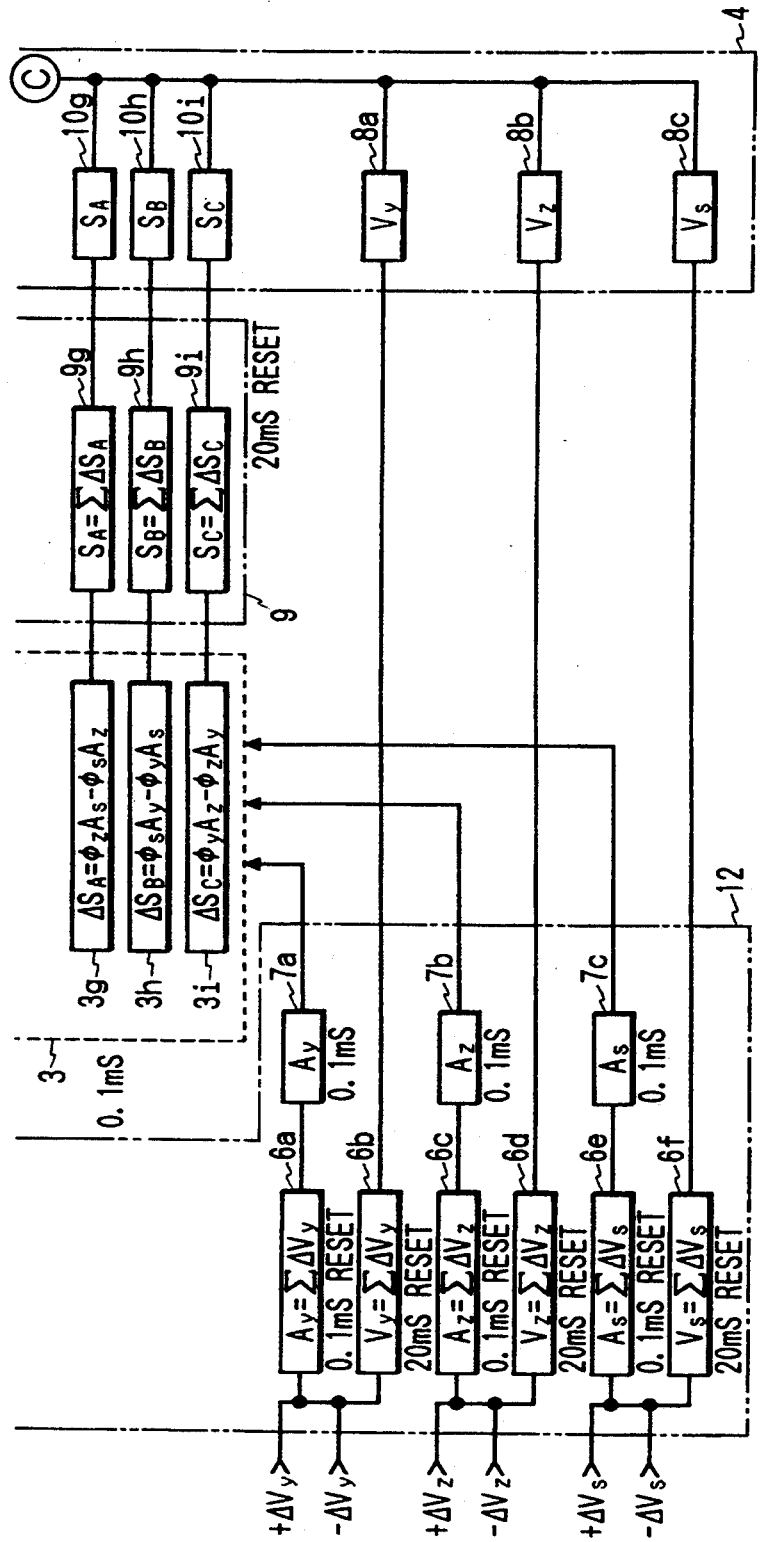
FIG. 7 is a diagram showing the other half of the part of the apparatus depicted in FIG. 6.

The dynamic error correcting apparatus for an inertial navigation system according to the present invention will be described with reference to FIGS. 1 and 2 (FIG. 1 showing one half of the apparatus and FIG. 2 the other half, the two figures being connected at the point indicated by reference character (A)). In FIGS. 1 and 2 the parts corresponding to those in FIGS. 4 and 5 are identified by the same reference numerals and no description will be given of them. In this example, the error correcting apparatus for the (X, Y, Z)-axis sensor system, shown in FIGS. 4 and 5, are further provided with counters 1g, 1h and latches 2g and 2h for processing the gyro pulses $\Delta\phi_s$ in the same manner as in the case of the other gyro pulses $\Delta\phi_x$, $\Delta\phi_y$ and $\Delta\phi_z$ and counters 6g, 6h and latches 7d, 8d for processing the acceleration pulses $\Delta V_s$ in the same manner as in the case of the other acceleration pulses $\Delta V_x$, $\Delta V_y$ and $\Delta V_z$. The pulse count values thus fetched in the latches 2g, 2h and 7d are similarly provided to the calculating section 3. In the calculating section 3, additionally-provided multiplier/subtractors 3d to 3f and 3j to 3l perform multiplication/subtraction processing on the basis of the data that are provided every 0.1-msec computation period, as described previously with reference to FIGS. 4 and 5 (or FIGS. 6 and 7). As a result, the following multiplied/subtracted values are obtained.

$$\Delta C_D = \phi_s\omega_x - \phi_x\omega_s \quad (9a)$$

$$\Delta C_E = \phi_s\omega_y - \phi_y\omega_s \quad (9b)$$

$$\Delta C_F = \phi_s\omega_z - \phi_z\omega_s \quad (9c)$$

$$\Delta S_D = \phi_s A_x - \phi_x A_s \quad (10a)$$

$$\Delta S_E = \phi_s A_y - \phi_y A_s \quad (10b)$$

$$\Delta S_F = \phi_s A_z - \phi_z A_s \quad (10c)$$

These multiplied/subtracted values (values obtained with the 0.1-msec period) are accumulated by additionally-provided accumulators 9d to 9f and 9j to 9l in the integrating section 9 within a 20-msec period and these accumulators are reset after the accumulated values $C_D$, $C_E$, $C_F$ and $S_D$, $S_E$, $S_F$ are provided to latches 10d to 10f and 10j to 10l at the end of the 20-msec period. This operation is repeated. The integrated values thus accumulated are provided to the strap-down calculating processor 5 every 20-msec period, together with the accumulated values $C_A$, $C_B$, $C_C$ and $S_A$, $S_B$, $S_C$ generated by the structure similar to that shown in FIGS. 4 and 5.

For example, since the terms having a coefficient $\sqrt{3}$ in expressions (3a) and (3b) are equivalent to expressions (9b) and (9a), respectively, expressions (3a) and (3b) become as follows:

$$\Sigma\{\Delta C_C - \sqrt{3}\ \Delta C_E\} = \{C_C - \sqrt{3}\ C_E\}$$

$$\Sigma\{\Delta C_C + \sqrt{3}\ \Delta C_D\} = \{C_C + \sqrt{3}\ C_D\}.$$

The strap-down calculating processor 5 is able to perform these expressions on the basis of the values $C_C$, $C_D$ and $C_E$ provided thereto. That is, the correctional quantities given by the expressions (3a), (3b) and (3c) can be calculated. Similarly, the strap-down calculating processor 5 can calculate all the correctional quantities given by the expressions (4a), (4b), (4c), . . . (8a), (8b), (8c). Conventionally, since calculation processing for navigation is performed for each of the four sensor systems, the processing overlaps among the sensor systems in considerable quantities, resulting in the load on the computer being large. According to the present invention, however, such overlapping calculations are processed in common to all of the four sensor systems, reducing the load on the computer accordingly.

Figure 8:
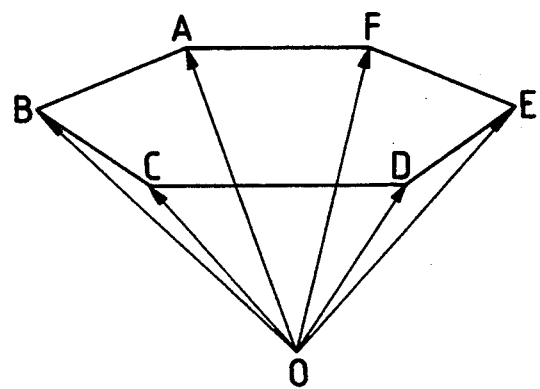
FIG. 8 is a diagram schematically illustrating an example of the redundancy inertia sensor system for the inertial navigation system to which the present invention is applicable.
Figure 9:
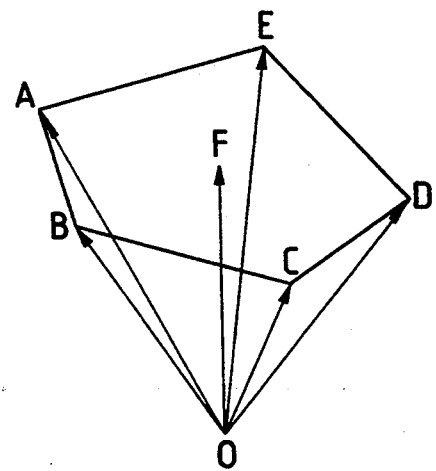
FIG. 9 is a diagram schematically illustrating another example of the redundancy inertia sensor system for the inertial navigation system to which the present invention is applicable.

FIGS. 8 and 9 illustrate other examples of the redundancy inertia sensor system, and the present invention is also applicable to such systems in the same manner as described above.

As described above, according to the dynamic error correcting apparatus of the present invention, dynamic errors are calculated by the dynamic error calculating section in common to all the sensor systems involved and calculation processing such as multiplication by a factor of $\sqrt{3}$ is performed by the strap-down calculating processor, that is, minimum units for calculations are calculated, and combinations of such minimum units are used to calculate correcting values. As compared with the conventional inertial navigation system wherein calculations are carried out for each of a plurality of sensor systems, the present invention increases the number of the calculations that can be processed in common to all the sensor systems. Hence, the present invention reduces the load on the computer or reduces the scale of dedicated hardware for correction.

It will be apparent that many modifications and variations may be effected without departing from the scope of the novel concepts of the present invention.

What is claimed is:

1. A dynamic error correcting apparatus for an inertial navigation system having inertia sensors provided on at least four axes, respectively, each of said inertia sensors for said four axes including a gyroscope, said apparatus comprising:

a counting section including first gyro pulse counting means which counts gyro pulses from said gyroscope of each axis during each of a plurality of predetermined calculation periods after being reset immediately before the start of said calculation period and outputs, at fixed time intervals, the count value as a first gyro pulse count value, and a second gyro pulse counting means which is reset at fixed time intervals, counts said gyro pulses and outputs the count value as a second gyro pulse count value;

a dynamic error calculating section including gyro multiplying/subtracting means whereby if three predetermined ones of said at least four axes are used as main axes and one of the remaining axes is used as an auxiliary axis, a difference between the product of said first gyro pulse count value for one main axis in all combinations of two different main axes selected from said remaining main axes and said second gyro pulse count value for the other main axis and the product of said first gyro pulse count value for said other main axis and said second gyro pulse count value for said one main axis is calculated as a main axis system gyro pulse error and a difference between the product of said first gyro pulse count value for said auxiliary axis in each combination of said auxiliary axis and one of said main axes and said second gyro pulse count value for said one of said main axes and the product of said first gyro pulse count value for said one of said main axes and said second gyro pulse count value for said auxiliary axis is calculated as an auxiliary-axis system gyro, and gyro error integrating means whereby said main-axis system gyro error and said auxiliary-axis system gyro error, obtained at said fixed time intervals, are accumulated within said each calculation period to obtain a gyro error integrated value; and a strap-down calculation processor which is supplied with said count values from said counting section and said dynamic error values from said dynamic error calculating section and calculates inertia information of an inertial object on the basis of said count values and said dynamic error values, said strap-down calculating processor being used in common to said inertia sensors of said at least four axes;

said strap-down calculating processor being operative to use said gyro error integrated values from said gyro error integrating means to calculate a correctional quantity of a coning error in each system in which one of said main axes is replaced by said auxiliary axis.

2. The dynamic error correcting apparatus of claim 1, wherein said inertia sensor of each axis includes an accelerometer;

wherein said counting section includes acceleration pulse counting means which is reset for each axis at said fixed time intervals, counts acceleration pulses from said accelerometer and outputs the count value as an acceleration pulse count value;

wherein said dynamic error correcting section includes: acceleration error multiplying/subtracting means whereby a difference between the product of said first gyro pulse count value for said one main axis in all combinations of two different main axes selected from said main axes and said acceleration pulse count value for said other main axis and the product of said first gyro pulse count value for said other main axis and said acceleration pulse count value for said one main axis is calculated as a main-axis system acceleration error, and a difference between the product of said first gyro pulse count value for said auxiliary axis in each combination of said auxiliary axis and one of said main axes and said acceleration pulse count value for said main axis and the product of said first gyro pulse count value for said main axis and said acceleration pulse count value for said auxiliary axis is calculated as an auxiliary-axis system acceleration error; and acceleration error integrating means whereby said main-axis acceleration error and said auxiliary-axis acceleration error, obtained at said fixed time intervals, are accumulated within said each calculation period to obtain an acceleration error integrated value; and wherein said strap-down calculating processor uses said acceleration error integrated value from said acceleration error integrating means to calculate the correctional quantity of a sculling error in each system wherein one of said main axes is replaced with said auxiliary axis.

* * * * *